Sept. 5, 1933.   A. KIRSCHEN   1,925,763
BUFFER DEVICE FOR SELF DRIVEN VEHICLES
Filed June 8, 1931
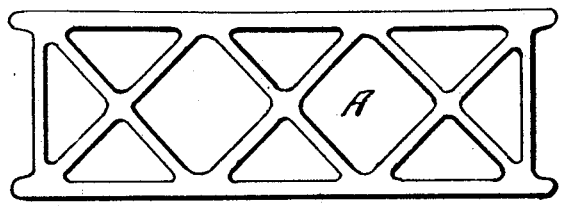
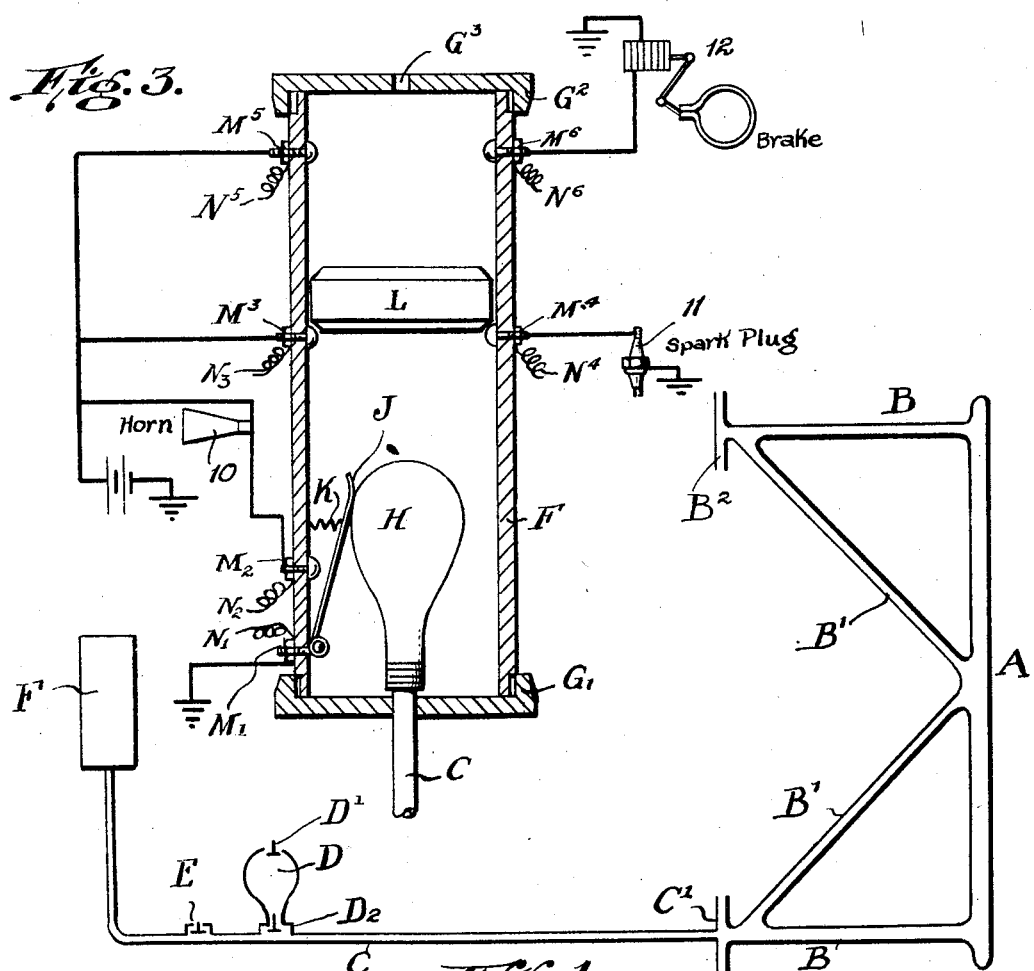
INVENTOR.
A. Kirschen
BY: Marks & Clerk
ATTORNEYS.

Patented Sept. 5, 1933

1,925,763

UNITED STATES PATENT OFFICE 1,925,763

BUFFER DEVICE FOR SELF-DRIVEN VEHICLES

Arnold Kirschen, Bucharest, Rumania

Application June 8, 1931, Serial No. 542,983, and in Germany June 10, 1930

4 Claims. (Cl. 180—83)

This invention relates to improvements in bumpers for motor vehicles and has for its object to provide a pump embodying such features of construction that the operation and signal appliances of such vehicles are under the control of and actuated by the bumper upon contact of the latter with a person, object or other obstacle.

A further object of the invention is the provision of an improved bumper of hollow and elastic material containing a suitable fluid which, upon deformation of the bumper, as will occur incident to contact of the bumper with an obstacle, will result in an increase of pressure of the fluid content in the bumper and the consequent operation of the signal and control devices.

In the accompanying drawing wherein an approved embodiment of the invention is illustrated:

Fig. 1 is a diagrammatic view showing the bumper in section and connected with the various parts associated therewith for the automatic control of the signal and vehicle control devices.

Fig. 2 is a front elevation of the bumper.

Fig. 3 is a vertical section through the fluid operated circuit control devices.

Referring to the drawing in detail, A indicates the bumper which, as will be understood, may be arranged at the front and back and sides of the vehicle or at any one point upon the latter, as desired. The entire bumper is formed of elastic material and is hollow and the body thereof which is arranged to contact with obstacles in the path of the vehicle is preferably composed of a plurality of intersecting bar-like members, as shown in Fig. 2 to form a grill work. The supports B of the bumper body extend rearwardly of the latter and are adapted for attachment to the chassis of the vehicle whereby the bumper is supported in the desired position thereon, braces B' being provided for strengthening and reinforcing the bumper unit.

As stated, all of the members of the bumper including the body A, the supports B and the braces B' are of hollow form and communicate one with the other, and being constructed of elastic material the body of the bumper is deformable upon contact with an object.

The hollow support B at one side of the bumper is closed as indicated at B2 and the support at the opposite side thereof is coupled at C' with a conduit C leading to the circuit controlling device F. Intermediate its ends, the conduit C is connected with a coupling D adapted for connection with a suitable pump whereby the conduit as well as the interior of the bumper may be filled with air or other fluid. The coupling D is provided with check vaves D' and D2 for preventing the escape of fluid introduced into the conduit and a suitable type of safety valve E is provided in the conduit to relieve the pressure therein in cases when an abnormal pressure is applied.

The circuit control device indicated at F is constituted by an upright cylinder enclosed at the bottom and at the top by cover plates G' and G2, the latter being provided with a port G3. The extremity at the conduit C extends into the interior of the cylinder and an elastic inflatable hollow body H is secured over the end thereof in a fluid-tight manner and occupies the lower part of the interior of the cylinder.

The cylinder F is formed of insulating material and supports binding posts M' and M2 connected with conductors N' and N2 forming part of the circuit of the horn or signal device indicated diagrammatically at 10 of the motor vehicle to which the invention is applied. The head of the upper binding post M2 forms a contact member engageable by a pivoted contact member J carried by the other binding post M', a spring K being interposed between the pivoted contact member J and the wall of the cylinder F so as to normally maintain the member J spaced from the binding post M2. Intermediate the top and bottom of the cylinder an additional pair of binding posts M3 and M4 are secured in the wall of the latter at opposite points and are connected with conductors N3 and N4 forming part of the ignition circuit designated generally at 11 of the engine of the motor vehicle. A sliding contact L normally rests upon the inner extremities of the binding posts M3 and M4, and being formed of conducting material, electrically connects the conductors N3 and N4 so that the engine of the vehicle may be operated in the usual manner.

A third pair of binding posts M5 and M6 are secured in the insulating wall of the cylinder F above the binding posts M3 and M4 and are normally spaced above the sliding contact member L. The conductors N5 and N6 connected with the uppermost pair of binding posts form part of the circuit controlling the brakes diagrammatically indicated at 12 of the motor vehicle and, thus, when the sliding contact member L is elevated it engages the posts M5 and M6 electrically connecting the conductors N5 and N6 and effects the automatic application of the vehicle brakes.

In conditioning the appliance for operation, a pump is connected with the coupling D and the pressure of air or other fluid in the bumper A, conduit C and elastic body H is increased to a point where the hollow body H is inflated sufficiently to depress the pivoted contact member J against the binding post M2. At this point the introduction of fluid into the conduit is interrupted and by manual operation of the safety or relief valve E, the pressure in the hollow body H is reduced to a point where contact between the members J and M2 is broken. The bumper is now in condition for operation, and in case of accidental contact with a person, object or other obstacle in the path of the vehicle, the body of the bumper is distorted and compressed and consequently the pressure of the fluid therein as well as in the conduit C and the hollow body H is increased. This increase in pressure results in expansion of the elastic body H which, as will be understood, is formed of elastic material of a higher degree of elasticity than the bumper whereby, upon increase of pressure, the hollow body H is distended or expanded. The primary effect of the expansion of the hollow body H is to engage the pivoted contact member J with the binding post M2, thereby completing the circuit over the conductors N' and N2 and operating the vehicle signal. Unless the vehicle is instantly brought to a stop, the increasing pressure exerted on the bumper due to the continued progress of the vehicle results in a further increase in the pressure of the fluid and the continued expansion of the elastic body H causes the latter to impinge and elevate the sliding contact L which latter, in moving upwardly, engages the binding posts M5 and M6. The motion of the sliding contact L interrupts the electrical connection between the conductors N3 and N4 thereby interrupting operation of the vehicle engine and, by engaging the binding posts M5 and M6, an electrical connection between the conductors N5 and N6 is established and the brakes of the vehicle are thus automatically applied so as to instantly arrest the movement of the vehicle. When the bumper resumes its normal shape and position or the valve E is manually operated, the pressure in the conduit C and in the hollow elastic body H is reduced and the body H returning to its normal condition due to its inherent elasticity, permits the sliding contact member L to resume its normal position and the pivoted contact member J to swing out of contact with the binding posts contact M2.

What I claim is:

1. A bumper for motor vehicles, comprising a body and supports formed of hollow elastic material providing an internal chamber, and vehicle control and signalling means connected with said chamber and operated in response to pressure variations therein.

2. A bumper for motor vehicles, comprising a body and supports formed of hollow elastic material providing an internal chamber, and vehicle control and signalling means connected with said chamber and operated in response to pressure variations therein, the body of said bumper being constituted by a plurality of intersecting and intercommunicating members.

3. A bumper for motor vehicles including a hollow elastic bumper body having an internal fluid chamber, a second hollow elastic body, means establishing communication between the two hollow bodies, the second mentioned hollow body being adapted to expand in response to increase of fluid pressure in the conduit and bumper body, and variable signal and control means actuated by the second mentioned hollow body.

4. A bumper for motor vehicles including a hollow elastic bumper body having an internal fluid chamber, a second elastic hollow body connected with the first mentioned body and adapted to expand in response to increase of fluid pressure in the first mentioned hollow body, and control switches engaged and operated by the second mentioned hollow body at various stages of expansion thereof.

ARNOLD KIRSCHEN.